Sept. 23, 1958　　F. SHALLENBERGER ET AL　　2,852,818
CORE BLOWING MACHINE FOR MAKING SHELL MOLDS
Filed Nov. 26, 1954　　　　　　　　　　　　　　　5 Sheets-Sheet 1
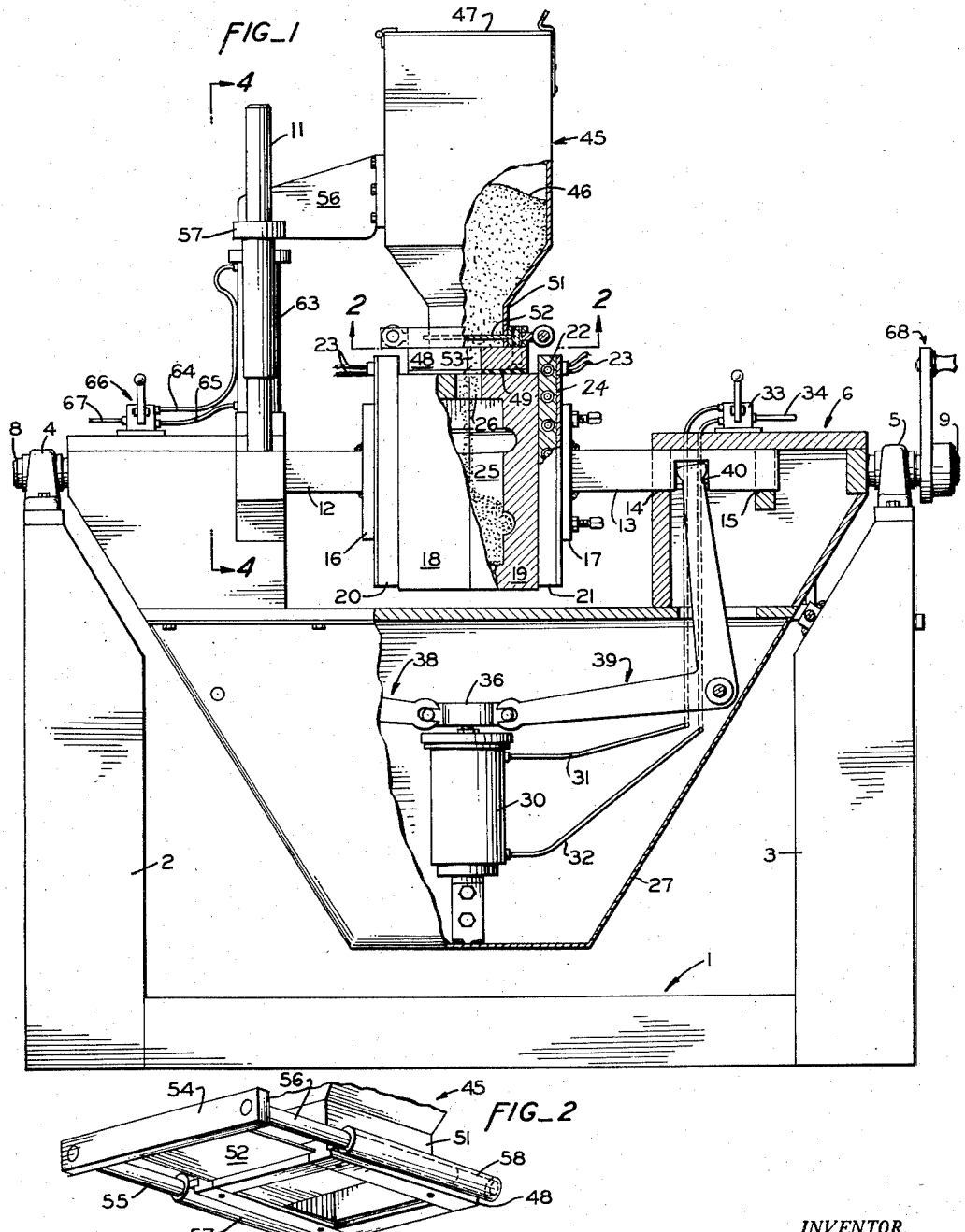
INVENTOR.
FRANK SHALLENBERGER
BY LOREN D. MILLARD
ATTORNEYS Sept. 23, 1958  F. SHALLENBERGER ET AL  2,852,818
CORE BLOWING MACHINE FOR MAKING SHELL MOLDS
Filed Nov. 26, 1954  5 Sheets-Sheet 2
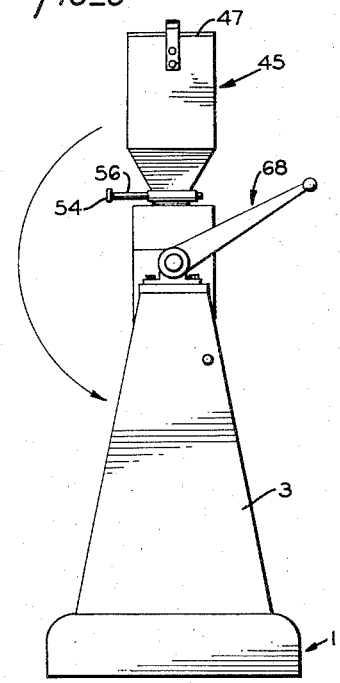
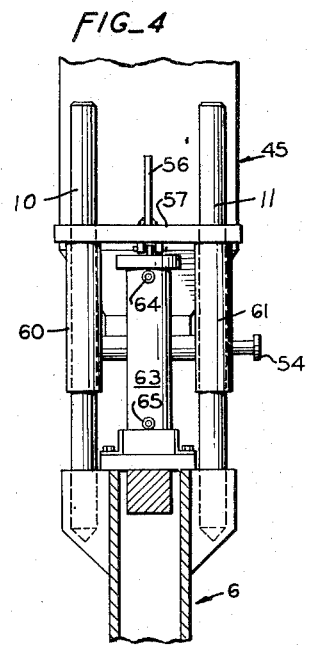
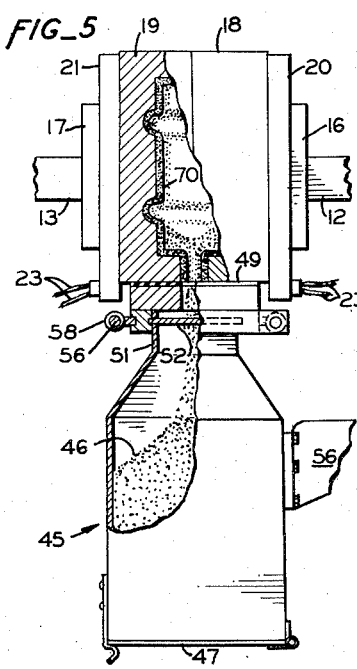
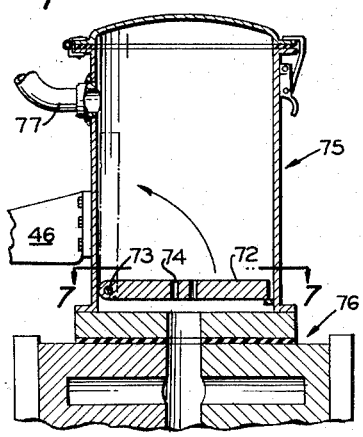
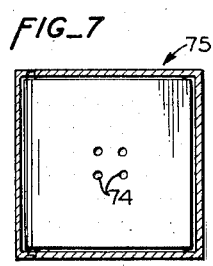
INVENTOR.
FRANK SHALLENBERGER
BY LOREN D. MILLARD
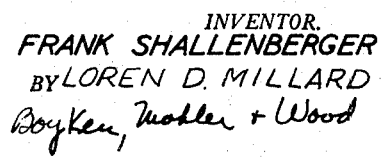
ATTORNEYS

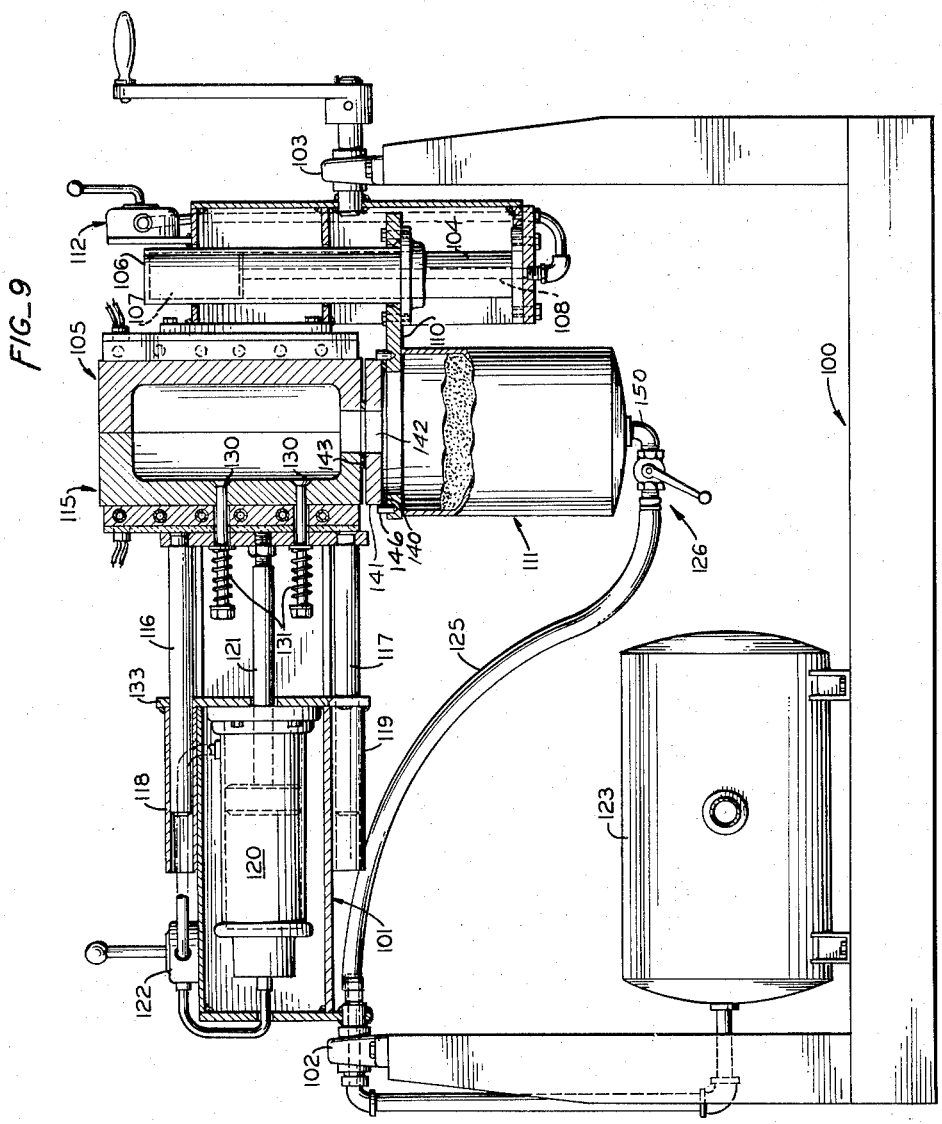

Sept. 23, 1958     F. SHALLENBERGER ET AL     2,852,818
CORE BLOWING MACHINE FOR MAKING SHELL MOLDS
Filed Nov. 26, 1954     5 Sheets-Sheet 4
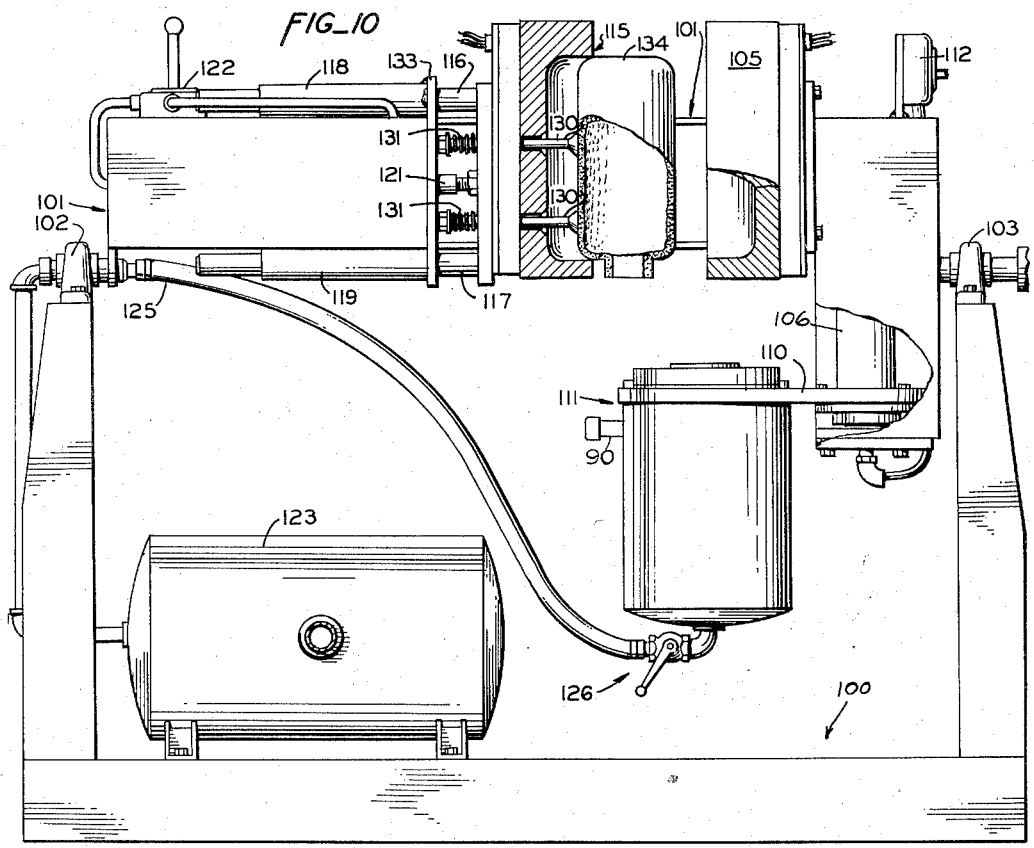
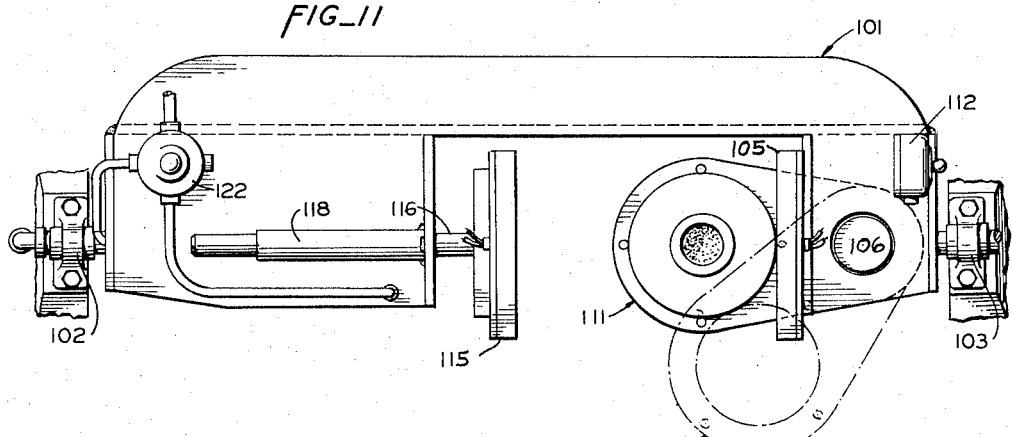
INVENTOR.
FRANK SHALLENBERGER
BY LOREN D. MILLARD
ATTORNEYS Sept. 23, 1958     F. SHALLENBERGER ET AL     2,852,818
CORE BLOWING MACHINE FOR MAKING SHELL MOLDS
Filed Nov. 26, 1954     5 Sheets-Sheet 5
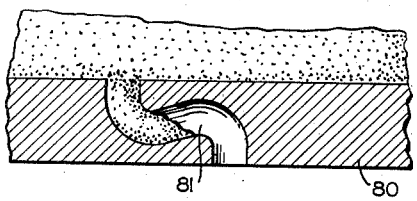
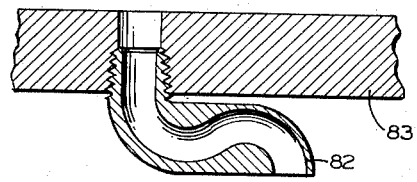
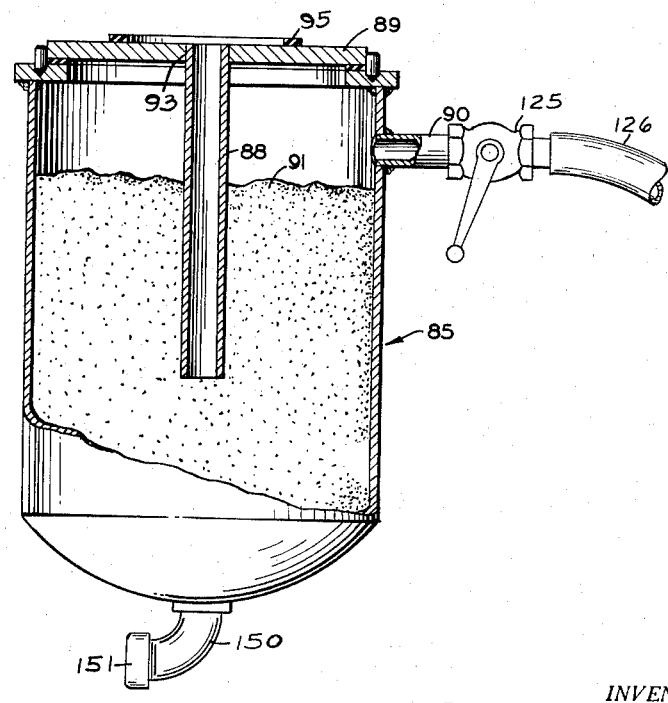
INVENTOR.
FRANK SHALLENBERGER
BY LOREN D. MILLARD
ATTORNEYS

United States Patent Office 2,852,818
Patented Sept. 23, 1958

2,852,818

CORE BLOWING MACHINE FOR MAKING SHELL MOLDS

Frank Shallenberger, Palo Alto, and Loren D. Millard, Belmont, Calif., assignors to Shalco Engineering Corporation Application November 26, 1954, Serial No. 471,256

3 Claims. (Cl. 22—10)

This invention relates to the art of shell molding, and more particularly to an apparatus and method for making shell molds and cores which are subsequently employed in casting. Although the present invention is adapted to be employed in the making of shell molds generally, it is particularly applicable to the making of shell cores such as are employed to make openings of various kinds in a casting.

In contrast with conventional oil sand cores, which are solid, shell cores are hollow. The cost of cores is thus substantially reduced and hollow cores permit the venting of gases during the casting operation thus reducing the likelihood of blow holes in the casting. In addition, as the metal casting shrinks, the hollow core readily collapses, thus obviating the formation of metal tears.

In the past, shell cores have been made in metal mold boxes or patterns which are heated in an oven and moved by hand to a molding bench. The separate portions of the pattern are then clamped together and a mixture of sand and thermo-setting resin (hereinafter called molding material) is dumped into the heated core box or pattern and allowed to cure for a period of time— usually between 5 and 15 seconds, depending upon pattern temperature. The pattern is then inverted and the uncured material is dumped out and can be used again. The pattern in which the core has been formed is then returned to the oven for curing, an operation which might take from 30 to 100 seconds. Thereafter, the pattern is removed from the oven, opened up, and the finished core removed. The core box or pattern is then normally returned to the oven for reheating so that the molding material will be cured when the cycle is repeated.

The above outlined conventional procedure is cumbersome, time consuming and dangerous. The high temperature of the portions of the pattern or core box— ranging from 350° F. to 500° F.—creates a hazard and often results in severe burns to the operator. Clamping of the portions of the pattern together is difficult and separation of the portions after the core or mold has been formed must be done with great care to prevent damage to the core or mold. In the case of deep contours, more energy than can be applied by hand is required, since the mold tends to stick to the pattern or core box.

Furthermore, it is difficult by the above described procedure to control the operating temperatures accurately, which control is essential for obtaining uniform results.

The main object of the present invention is to overcome the objections to the prior art method and apparatus heretofore employed.

Another object of the invention is the provision of an apparatus incorporating a heating means within the apparatus itself, thus obviating the disadvantages of a separate heating oven.

Still another object of the invention is the provision of an apparatus that insures accurate and rigid clamping of the core box portions and also permits the core box to be opened without danger of injuring the core or mold, and without physical effort on the part of the operator.

Yet another object of the invention is the provision of an apparatus that incorporates a supply of molding material and is arranged so that such material is readily transferred into and out of the core box as required.

Another object of the invention is the provision of a novel method and apparatus for inserting molding material into the core box in a manner that insures filling normally inaccessible crevices and corners.

Another object of the invention is the provision of a novel method or apparatus which may be used for the production of either shell molds or shell cores.

Other objects and advantages will be seen from the following specification and drawings:

Fig. 1 is a front elevation of one form of apparatus with portions broken away and in section to show internal structure.

Fig. 2 is a perspective view of the lower end of the hopper of Fig. 1.

Fig. 3 is an end elevation of the apparatus of Fig. 1.

Fig. 4 is a fragmentary cross section taken along lines 4—4 of Fig. 1, showing the guide means for reciprocating the hopper.

Fig. 5 is a side elevation of the hopper in its inverted position and partially broken away and in section for clarity.

Fig. 6 is a vertical section of a hopper in its upright position and disclosing a modified form thereof, wherein a swinging gate is employed to control the flow of molding material to and from the hopper.

Fig. 7 is a transverse section through the hopper of Fig. 6 showing the construction of the gate.

Fig. 8 is a view similar to Fig. 7 showing a modified form of control means comprising a flexible diaphragm.

Fig. 9 is a front elevation of another form of apparatus for carrying out the present invention. Portions of the device are broken away and in section to show internal structure.

Fig. 10 is a view similar to Fig. 9, but with the core box in core removing position and with the hopper retracted.

Fig. 11 is a top plan view of the apparatus of Fig. 10 with the core box portions and ejector means removed.

Fig. 12 is a longitudinal section through a modified form of hopper.

Figs. 13 and 14 are sections through the discharge end of a hopper showing different forms of a trap therefor.

In detail, and referring to Figs. 1–5 wherein one form of apparatus is disclosed, the device comprises a stationary base generally designated 1 which includes a pair of vertical posts 2, 3, respectively, provided with bearings 4, 5. Swingably supported in bearings 4, 5 is a frame generally designated 6 which is provided with journals 8, 9, respectively, at its opposite ends, and which journals are rotatable in bearings 4, 5.

Inwardly of journals 8, 9 are a pair of slide members 12, 13 which are slidably supported in horizontally spaced bearings 14, 15 in frame 6. On the inner ends of slides 12, 13 are core box support plates 16, 17 to which are secured core box portions 18, 19, respectively, which when in engaging relationship, form the core box or pattern.

Between the portions 18, 19 and their respective support plates 16, 17 are core box heaters 20, 21 which are provided with electrical heating elements 22 connected to a source of electrical power by flexible leads 23, and separated from support plates 16, 17 by layers of insulating material 24 to prevent heat transfer to said support plates. Conventional thermostatic controls may be provided for heaters 20, 21 as desired.

It should be noted at this point that when assembled as shown in Fig. 1, the core box portions unite to form an interior space 25 in which the core is formed, and a spout 26 through which the material is conveyed into said space or emptied therefrom.

Frame 6 includes a cover 27 which entirely encloses one side of the frame 6. On the lower end of cover 27, as seen in Fig. 1, or on a suitable bracket secured to frame 6, an air cylinder 30 is provided. Air under pressure is conveyed to the opposite ends of cylinder 30 through conduits 31, 32 which in turn are connected to a manually actuated air valve 33, on frame 6 to which air under pressure is supplied from a source of air pressure (not shown) by means of flexible line 34.

The outer end of the piston rod of cylinder 30 is provided with a fitting 36 to which are pivotally secured the corresponding ends of a pair of bell cranks generally designated 38, 39. The other ends of bell cranks 38, 39 are received within sockets 40 on slides 12, 13. Upon actuating valve 33 to apply air pressure through conduit 32 to the lower end of air cylinder 30 it will be apparent that the fitting 36 on the cylinder piston will move upwardly and reciprocate the slides 12, 13 oppositely outwardly to separate the core box portions 18, 19.

Above the frame 6, as seen in Fig. 1, is positioned a hopper generally designated 45 which is adapted to contain a charge 46 of molding material which may be inserted into the hopper through enclosure 47. At the end opposite closure 47 the hopper 45 is provided with a relatively heavy, generally rectangular boss 48 to which is secured a heat resistant gasket 49 which is adapted to engage the core box portions 18, 19 and form a seal therewith.

Within the spout 51 of hopper 45 is a sliding closure or shutter 52 (Fig. 2) which, when open, permits material to be fed to and from the core box and, when closed, prevents such flow. The boss 48 of hopper 45 is provided with a discharge opening 53 in alignment with the mouth 26 of the core box 18, 19.

The shuttter 52 is provided with a head piece 54 (Fig. 2) to which is secured a pair of parallel rods 55, 56 reciprocably supported within tubes 57, 58. This structure permits the shutter 52 to be opened and closed very readily.

The hopper 45 is rigidly secured, through a bracket 56 to a cross head 57 (Fig. 4) which, in turn, is apertured to be slidably received on a pair of vertically extending parallel guide rods 10, 11. The lower ends of rods 10, 11 are rigidly secured to the frame 6. Sleeves 60, 61 may be rigidly secured as by welding to the cross head 57 to prevent cocking of the cross head relative to the rods 60, 61.

Operatively connected between the cross head 57 and the frame 6 is an air cylinder 63 to the opposite ends of which are connected air conduits 64, 65 (Fig. 1). The latter are connected with a valve 66 which receives air under pressure through flexible conduit 67 from a compressed air source (not shown).

It will be apparent by actuation of valve 66 that the hopper 45 may be reciprocated toward and away from the core box so as to permit the portions 18, 19 of the core box to be relatively translated and to bring the hopper into and away from material transfer position with the core box or pattern.

The operation of the device is as follows: With the apparatus in the position of Fig. 1 and with the shutter 52 closed, the portions 18, 19 of the core box or pattern are brought into engagement by admitting air through conduit 31 to the upper end of air cylinder 30. The hopper 45 is then moved downwardly to the position shown in Fig. 1 by admitting air to the upper end of air cylinder 63 through actuation of valve 66. Shutter 52 is then opened to allow molding material from the charge 46 to fall by gravity into the space 25 formed by the core box portions 18, 19. A hand crank 68 (Figs. 1, 3) is provided on journal 9 so that the operator may rock the apparatus, which includes the entire frame 6 and the hopper 45. Such rocking action, as the molding material is discharged into the core box, facilitates the flow of material into the crevices of the pattern.

It will be understood that when the resin of the sand-resin mixture comes into close proximity to the hot portions 18, 19 of the core box, such resin flows and hardens to form a mold which is complementary to the inner configuration of the portions 18, 19 of the core box and adhered thereto. Inasmuch as the thickness of the mold formed by such flow of the resin is determined by the length of time it is subjected to the heat from the core box 18, 19 it is possible to obtain uniform molds or cores by permitting the material to remain in the core box a predetermined length of time. At the end of such period of time (usually from 5 to 15 seconds), the mechanism is rotated through 180° by means of crank 68 so that the hopper 45 is under the core box as seen in Fig. 5. The excess material, which has not been affected by the heated core box, falls back into the hopper leaving a relatively thin walled core 70 (Fig. 5). At this point the frame may again be rocked or vibrated to cause all loose material to fall back into the hopper 45. The shutter 52 is then closed and the mechanism rotated back to its normal posiiton of Fig. 2.

Valve 66 is then actuated to retract the hopper upwardly away from the core box. Meanwhile the core is still being subjected to the heat from heaters 20, 21 and is still undergoing a curing process which may be continued from 20 to 100 seconds, depending primarily on core box temperature and wall thickness of the core.

After the curing process is completed the valve 33 is actuated to separate the core box portions 18, 19 to permit removal of the core 70.

After the core 70 is removed, the valve 33 is again actuated to bring the core box portions again into engagement and the same cycle is repeated.

It should be noted by the above described procedure there is no waste of time after the core is removed and the next cycle may be immediately initiated.

A modified form of hopper 75 is shown in Fig. 6 wherein a swingable gate 72 is provided across the discharge end of the hopper and pivoted on a pin 73. Gate 72 is provided with a plurality of relatively small perforations 74 (Figs. 6, 7) which normally prevent flow of the granular molding material therethrough. After the hopper 75 has been moved into engagement with the core box generally designated 76, and with the gate in the horizontal position of Fig. 6, air under pressure is admitted through a flexible hose 77 into the end of the hopper opposite gate 72. This pressure forces the molding material through holes 74 and into the core box 76. The device is then inverted as described before at which time the gate 72 opens to its dot-dash position of Fig. 6 by gravity or may be positively swung to open position by means of a crank (not shown). Upon inversion of the mechanism, the molding material returns by gravity into the hopper 75.

Fig. 8 shows a diaphragm type of closure wherein a flexible diaphragm 77 of rubber or the like is employed to close off the hopper 78. In this case a slit 79 is formed in diaphragm 77 so that the material is not normally permitted to pass through said diaphragm. However, upon applying pressure to the inside of the hopper 78 the diaphragm 77 is deflected causing the slit 79 to open and causing the material to be forced into the core box. Two or more slits 79 may be employed if desired and such slits may be in intersecting relationship.

Another type of closure is seen in Fig. 13 wherein the hopper is formed with a wall 80 at its discharge and in which wall is formed a generally S-shaped passageway 81 which acts as a trap to prevent flow of material therethrough except when such material is subjected to air pressure as above described.

It will be understood that the closures shown in Figs. 8, 13, 14 are incorporated in a swinging gate similar to that shown in Fig. 6 so as to permit the sand to return to the hopper.

Figs. 9–11 illustrate an apparatus, somewhat similar in function to the apparatus of Figs. 1–5, but having certain advantages thereover.

In this case a stationary base 100 is provided as before and a frame generally designated 101 (Figs. 9 and 11) is rotatably supported on bearings 102, 103. A nonreciprocating core box portion 105 and its associated heating means is provided at one end of frame 101. At the same end of frame 101 is a stationary piston 104 (Fig. 9) with which there cooperates a closed sleeve 106 forming an air chamber 107 in cooperation with piston 104. Air under pressure is applied to chamber 107 through an axially extending bore 108 in piston 104.

Secured to sleeve 106 is a bracket 110 which carries the hopper generally designated 111. It will be apparent from Figs. 9, 10 that by controlling air flow to chamber 107, as by valve 112, the hopper 111 may be moved from a lower position spaced downwardly from the core box (Fig. 10) to an upper position in engagement with the core box (Fig. 9).

A reciprocably supported core box portion 115 is provided with its associated heater means and including a pair of vertically spaced parallel supporting rods 116, 117 which are slidably received in tubular guides 118, 119, respectively.

An air cylinder 120 is supported on frame 101 with its piston rod 121 connected to the support plate of core box portion 115. Air, controlled by valve 122 may be admitted to either end of the cylinder 120 for reciprocating the portion 115 toward and away from portion 105.

In the form of apparatus shown in Fig. 9, air is supplied from a tank 123 through flexible hose 125 to the end of the hopper 111 that is opposite the core box. By this arrangement, and by actuation of valve 126, the material may be blown into the core box as desired when the hopper is swung from the position of Fig. 9 to a position above the core box.

The operation of the device of Fig. 9 is similar to that shown in Fig. 1 in that the hopper 111 is swung upwardly to a position above the core box 105, 115 in order to discharge molding material into the core box. However, in this case air pressure may be employed to force the molding material into the crevices of the core box. When the hopper is returned to the position of Fig. 9, and when the air pressure has been removed by actuating valve 126 the excess material that has not been bonded by the heat of the core box falls back into the hopper 111.

It will be noted that the hopper 111 is open at its top and is provided with a gasket 140 around its periphery and is adapted to engage the outer periphery of a flat cover plate 141 which is provided with a relatively large central aperture 142. A gasket 143 is positioned on cover plate 141 surrounding central aperture 142 so as to engage the core box portions 105, 115 in like manner as gasket 49 of Fig. 1. Central aperture 142 is sufficiently large to permit the excess molding mixture to be discharged by gravity into hopper 111.

Although the devices of Figs. 1 and 9 both lend themselves to the use of ejector pins such ejector pins are shown only in Fig. 9. In Fig. 9 ejector pins 130 are reciprocably supported on core box portion 115 and urged to an inoperative position by means of springs 131.

When the core box is opened by reciprocation of the portion 115 to the left as seen in Fig. 9, the ejector pins 131 strike the stationary plate 133 carried by frame 101 and eject the core 134 (Fig. 10).

As best seen in Fig. 10, the hopper bracket 110 is swingably mounted with air cylinder sleeve 106 on piston 104 so that it may be swung away from core box 105, 115 when it is desired to fill the hopper. To facilitate such filling operation the cover plate 141 may be removed by simply lifting it off gasket 140. Positioning pins 146 secured to hopper 111 may be employed to insure correct positioning of cover plate 141.

A modified form of hopper is shown in Fig. 12 wherein hopper 85 is similar to hopper 111 of Fig. 9 except that the air inlet elbow 150 is closed off by means of a cap 151. In addition, a nipple 90 is provided adjacent the open end of hopper 85 to which may be secured the hose 126 and valve 125.

A cover plate 89 is provided on hopper 85 in like manner as cover plate 141 of Fig. 9 except that a relatively small central aperture 93 is formed therein and a pipe 88 is secured at one end to said plate and extends into the hopper below the normal level of the molding material. A gasket 95, similar to gasket 143 above described, is secured to cover plate 89 and is adapted to abut the core box 105, 115 when the hopper is raised.

With the hopper of Fig. 12 it is not necessary to swing the core box and the hopper about a horizontal axis to discharge molding material into the core box. It is merely necessary to apply air pressure to the interior of hopper 85 by actuating valve 126 thus causing the molding material to be forced upwardly through pipe 88 into the core box. It will be noted, assuming sufficient pressure is employed, that the molding material will be forced into the crevices of the pattern or core box in like manner as in the apparatus of Fig. 9.

When it is desired to remove the excess molding material from the core it is merely necessary to turn off the air pressure by actuation of valve 126 and move the hopper downwardly slightly away from sealing engagement with the core box by actuating valve 112 (Fig. 9). The hopper may then be swung about the vertical axis of sleeve 106 to the dot dash position of Fig. 11 so that such excess material can fall onto a suitable receptacle such as tray 96 supported on base 1.

From the above description it will be noted that the hopper 111 may readily be converted to a syphon type of hopper such as shown in Fig. 12 by merely adding the plate 89 (Fig. 12) provided with the pipe 88, capping elbow 150 and moving the air supply to the nipple 90.

The apparatus of Figs. 9–12 is somewhat simpler in construction than that shown in Fig. 1. Bell cranks 38, 39 are eliminated, the shutter and hopper guide tubes are not required and operation of the device is made easier insofar as the operator is concerned. In addition rigidity of the machine is enhanced.

In operating the device of Fig. 9, the portion 115 of the pattern is reciprocated toward portion 105 by actuating valve 122 to move the piston in cylinder 120 to the position of Fig. 9 wherein the pattern is ready to receive the molding material.

Hopper 111 is raised to the position of Fig. 9, wherein it is in engagement with the pattern portions 105, 115, by actuation of valve 112 to raise sleeve 106 to which said hopper is secured.

The entire assembly may then be rotated on bearings 102, 103 to an inverted position with hopper 111 above the pattern. Valve 126 may then be opened to blow the molding material downwardly into the pattern if desired. However in some instances, especially when the pattern is not intricate, gravity alone may be relied on to transfer the material into the pattern. In either case, excess molding material is returned to hopper 111 by rotating the device back to the position of Fig. 9.

Hopper 111 is then lowered to the position of Fig. 10 by actuating valve 112 and portion 115 of the pattern is translated away from portion 105 by actuation of valve 122 to permit removal of the mold or core 134.

If the siphon arrangement of Fig. 12 is employed, it will be noted that no inversion of the machine is required and the hopper may remain under the pattern at all times. The only disadvantage of this arrangement is that some excess material must be allowed to drop from the device onto pan 96 (Fig. 12) but this in itself is not sufficient to offset the advantage inherent in the syphon method.

It should also be noted that plate 89, and pipe 88 which is secured thereto, together with gasket 95, may be removed to facilitate fitting the hopper 111. Furthermore, the fact that the pressure effected by cylinder 107 urges plate 89 and its associated gaskets together, thereby effecting a seal, makes for an inexpensive structure inasmuch as no additional securing means are required.

Although hopper 111 must be swung away from the pattern to the dot-dash position of Fig. 11 to permit removal of excess molding material, it is necessary to shift said hopper 111 only a slight distance away from the pattern to permit such swinging.

It should be noted that the construction of the molding material valve means such as shown in Figs. 7, 8, 12, 13 may be employed in either the device of Fig. 1 or the devices of Figs. 9 and 12.

The above described apparatus and method have been employed with decided improvement over prior art systems. Not only is accuracy of the mold or core improved, but a speedier and more economical operation results.

We claim:

1. Apparatus for forming shell molds or cores comprising a pattern adapted to receive molding material therein and formed in separable portions, means supporting said portions for relative translatory movement along a horizontal path of travel from a discharge position in which said portions are separated to permit removing a mold or core therefrom, to a mold forming position with said portions in engagement, a hopper for molding material, means supporting said hopper for movement transversely of said path toward and away from said pattern, means for swinging said pattern and said hopper about said path of travel for moving said hopper from a position above said pattern to a position below said pattern and vice versa, for transferring material from said hopper to said pattern and vice versa, valve means for controlling the flow of material between said hopper and said pattern to permit stopping the flow of material from said hopper to said pattern when said hopper is above said pattern, said valve means comprising a gate in said hopper, said gate being formed with a restriction to prevent flow of material from said hopper to said box and swingable to a position permitting the free flow of material from said pattern to said hopper.

2. Shell molding apparatus comprising a pair of pattern forming portions, means mounting said portions for relative translation from spaced apart positions permitting removal of a mold or core from said portions to a mold forming position with said portions in engagement and cooperating to form a cavity provided with an outwardly opening spout for receiving molding material therethrough, bearing means carried by said mounting means rotatably supporting the latter for swinging about a horizontal axis extending longitudinally of the path of relative movement of said portions, a hopper for molding material carried by said mounting means whereby said hopper and said portions may be swung as a unit about said bearing means, means on said mounting means for translating said hopper from a position spaced from said portions to a position in engagement with said portions, said hopper being formed with a discharge opening for discharging molding material therefrom and adapted to register with said spout when said hopper is in engagement with said portions to establish direct communication between said discharge opening and said spout.

3. Shell molding apparatus comprising a pair of pattern forming portions, means mounting said portions for relative translation from spaced apart positions permitting removal of a mold or core from said portions to a mold forming position with said portions in engagement and cooperating to form a cavity provided with an outwardly opening spout for receiving molding material therethrough, bearing means carried by said mounting means rotatably supporting the latter for swinging about a horizontal axis extending longitudinally of the path of relative movement of said portions, a hopper for molding material carried by said mounting means whereby said hopper and said portions may be swung as a unit about said bearing means, means on said mounting means for translating said hopper from a position spaced from said portions to a position in engagement with said portions, said hopper being formed with a discharge opening for discharging molding material therefrom and adapted to register with said spout when said hopper is in engagement with said portions to establish direct communication between said discharge opening and said spout, said hopper being provided with an air inlet at its end opposite said discharge opening, means for supplying air under pressure through said inlet when said hopper is in a pattern charging position above said pattern and for reducing said pressure when said hopper is below said pattern to permit the return of excess material to said hopper.

References Cited in the file of this patent

UNITED STATES PATENTS

| 823,530 | Hewlett | June 19, 1906 |
| 1,573,436 | Anderson | Feb. 16, 1936 |
| 2,457,756 | Vest | Dec. 28, 1948 |
| 2,611,938 | Hansberg | Sept. 30, 1952 |
| 2,637,881 | Peterson | May 12, 1953 |
| 2,687,559 | Peterson | Aug. 31, 1954 |
| 2,688,780 | Anderson | Sept. 14, 1954 |
| 2,692,409 | Herbruggen | Oct. 26, 1954 |
| 2,761,186 | Peterson | Sept. 4, 1956 |

OTHER REFERENCES

Foundry, October 1950, pages 162, 164 and 168.
Foundry, November 1952, page 265.